(12) United States Patent
Leyba (10) Patent No.: US 9,317,589 B2
(45) Date of Patent: Apr. 19, 2016

(54) SEMANTIC SEARCH BY MEANS OF WORD SENSE DISAMBIGUATION USING A LEXICON

(75) Inventor: Todd Leyba, Potomac, MD (US)

(73) Assignee: International Business Machines Corporation, Armonk, NY (US)

(*) Notice: Subject to any disclaimer, the term of this patent is extended or adjusted under 35 U.S.C. 154(b) by 2195 days.

(21) Appl. No.: 12/188,047

(22) Filed: Aug. 7, 2008

(65) Prior Publication Data

US 2010/0036829 A1 Feb. 11, 2010

(51) Int. Cl.
*G06F 7/00* (2006.01)
*G06F 17/00* (2006.01)
*G06F 17/30* (2006.01)

(52) U.S. Cl.
CPC .............................. *G06F 17/30684* (2013.01)

(58) Field of Classification Search
CPC ................................................ G06F 17/30315
USPC .................................................. 704/260, 26
See application file for complete search history.

(56) References Cited

U.S. PATENT DOCUMENTS

| 6,098,042 A * | 8/2000 | Huynh .......................... 704/260 |
| 6,424,983 B1 | 7/2002 | Schabes et al. |
| 7,013,264 B2 | 3/2006 | Dolan et al. |
| 7,031,909 B2 | 4/2006 | Mao et al. |
| 2003/0004706 A1 * | 1/2003 | Yale et al. .......................... 704/9 |
| 2005/0192792 A1 * | 9/2005 | Carus et al. ....................... 704/2 |
| 2008/0275694 A1 * | 11/2008 | Varone ............................. 704/9 |
| 2009/0254540 A1 * | 10/2009 | Musgrove et al. ................ 707/5 |
| 2010/0268711 A1 * | 10/2010 | Liao et al. ..................... 707/736 |

* cited by examiner

*Primary Examiner* — Susan Chen
(74) *Attorney, Agent, or Firm* — Patterson & Sheridan, LLP (57) ABSTRACT

Techniques are disclosed for analyzing a "context window" of a search query to determine a semantic meaning of a search word and to filter search results based upon the semantic meaning. Generally, a lexicon may be used to store forms, meanings, and usages of words and phrases. When a user specifies a query, a semantic analyzer obtains all of the word senses for a search word. The semantic analyzer applies lexical analysis techniques to the search word and context window to obtain a total score for each word sense and selects the word sense with the highest total score. After query results such as documents containing the search words are obtained, the semantic analyzer applies lexical analysis techniques to filter the results so that only documents which use the search terms, according to the selected word sense are returned.

25 Claims, 6 Drawing Sheets

SEMANTIC SEARCH BY MEANS OF WORD SENSE DISAMBIGUATION USING A LEXICON

BACKGROUND OF THE INVENTION

1. Field of the Invention

Embodiments of the present invention relate to techniques for applying a semantic meaning of a word for information retrieval purposes.

2. Description of the Related Art

Full text search engines and other information retrieval systems have become an essential tool for researching and gathering information from computer systems. For example, some websites provide a search engine which allows users to search for information or documents by entering one or more words into a query interface. The search engine searches for documents (e.g., web pages, text/pdf files, etc.) that contain words that match the query terms. A summary of search results may then direct the user to relevant documents.

Most full text search engines return a list of documents that morphologically match one or more of the key terms specified in the user's query. For example, when a user enters "swimming" as a search term, the search engine may return documents that contain morphological variations of the word, such as "swims," "swam," and "swim." Additionally, search engines may return documents that contain different semantic uses of the search words. For example, if a user performs a search for documents using the word "bill," then a search engine may return a list of documents that describe paid invoices, documents that describe pending legislation, and documents that describe dollar bills.

SUMMARY OF THE INVENTION

One embodiment of the invention includes a computer-implemented method of filtering search results returned for a search query. The search results may include one or more documents. The method may generally include identifying at least a first search term included in the search query, determining a plurality of word usage senses associated with the first search term, and selecting a first word usage sense from the plurality of word usage senses associated with the first search term. For each document in the search results, a second word usage sense in which the first search term is used within the document is determined. Upon determining the first word usage sense selected for the first search term matches the second word usage sense determined for the document, the document is included in a set of the filtered search results. The method may also include returning the set of filtered search results.

Another embodiment of the invention includes a computer readable storage medium containing a program which, when executed, performs an operation for filtering search results returned for a search query based upon a word usage sense. The search results may include one or more documents. The operation may generally include identifying at least a first search term included in the search query, determining a plurality of word usage senses associated with the first search term, and selecting a first word usage sense from the plurality of word usage senses associated with the first search term. For each document in the search results, a second word usage sense in which the first search term is used within the document is determined. Upon determining the first word usage sense selected for the first search term matches the second word usage sense determined for the document, the document is included in a set of the filtered search results. The operation may also include returning the set of filtered search results.

Still another embodiment of the invention includes a system having a processor and a memory containing a program, which, when executed by the processor is configured to perform an operation for filtering search results returned for a search query based upon a word usage sense. The search results may include one or more documents. The program may be generally configured identify at least a first search term included in the search query, determine a plurality of word usage senses associated with the first search term, and select a first word usage sense from the plurality of word usage senses associated with the first search term. For each document in the search results, a second word usage sense in which the first search term is used within the document may be determined. Upon determining the first word usage sense selected for the first search term matches the second word usage sense determined for the document, the document may be included in a set of the filtered search results. The program may be further configured to return the set of filtered search results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Most full text search engines return a list of documents that morphologically match one or more key terms specified in a user's query. For example, when a user enters "swimming" as the search term, the search engine may return documents that contain morphological variations of the word, such as "swims," "swam," and "swim." In general, morphological techniques are used by search engines to improve the recall of a search without sacrificing precision. "Recall" generally refers to the number of relevant documents in a search response as compared to the total number of relevant documents in a corpus of documents. "Precision" generally refers to a ratio of relevant to non-relevant documents in the search response alone.

Precision can be adversely affected when a search term has more than one meaning (referred to as polysemy). For example, when searching for documents that contain the word "bill," a search engine may return a document that includes the word "bill" in the context of paid invoices and another document that includes the word "bill" in the context of a legislative process. Another document may include the word "bill" to refer to dollar bills and yet another document may reference a duck-billed platypus. Thus, the intended word meaning (or sense) must be determined in order to eliminate unwanted search results and improve precision. As used herein, a process of determining the meaning of a word is generally referred to as "word sense disambiguation." In one embodiment, this process uses a "lexicon" which embodies the knowledge of a specific language. The lexicon may be used to identify multiple forms, meanings, and usage of words and phrases of the language.

Polysemy has long been a challenge for information retrieval systems and language processing. "Connectionist" approaches to word sense disambiguation involve training a system to recognize a particular pattern of words and to associate that pattern with a particular word sense. However, the approach employs a fixed word content window that significantly compromises performance. Furthermore, accuracy of this approach degrades rapidly as the number of word senses increases. Other approaches rely on vector space representations, which form clusters of words based on their frequency of occurrence within a document and other documents in the corpus. Unfortunately, this approach also suffers in performance due to the large number of dimensions in the vector space when large numbers of documents with many terms are used. Another approach to word sense disambiguation uses natural language parsing of sentences, which depends on the prior existence of a "word model." However, substantial effort is required to construct the word model and the models are limited in the extent of the domains that they can cover.

Embodiments of the invention apply lexical analysis techniques to a query by analyzing words within a "context window" of a search word to determine a semantic meaning of the search word, i.e., a word usage sense, or more simply, just "sense" in which the word is used. Once the "sense" that a word is used in a search query is identified, search results may be filtered based upon the semantic meaning. Generally, a lexicon may be used to store forms, meanings, and usage of words, as well as phrases of a specific language. In one embodiment, when a user specifies a query, a semantic analyzer identifies a set of possible "senses" for a search word. The semantic analyzer applies lexical analysis techniques to the search word and context window to determine a score for each possible word sense. The semantic analyzer may select the word sense with the highest score. Alternatively, the user may select a word sense. After a search engine obtains query results, the semantic analyzer applies lexical analysis techniques to filter the results so that only documents which use the selected word sense are returned. Alternatively, the semantic analyzer may provide a search results summary that includes the number of documents in the query results that use word according to each of the possible word senses.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
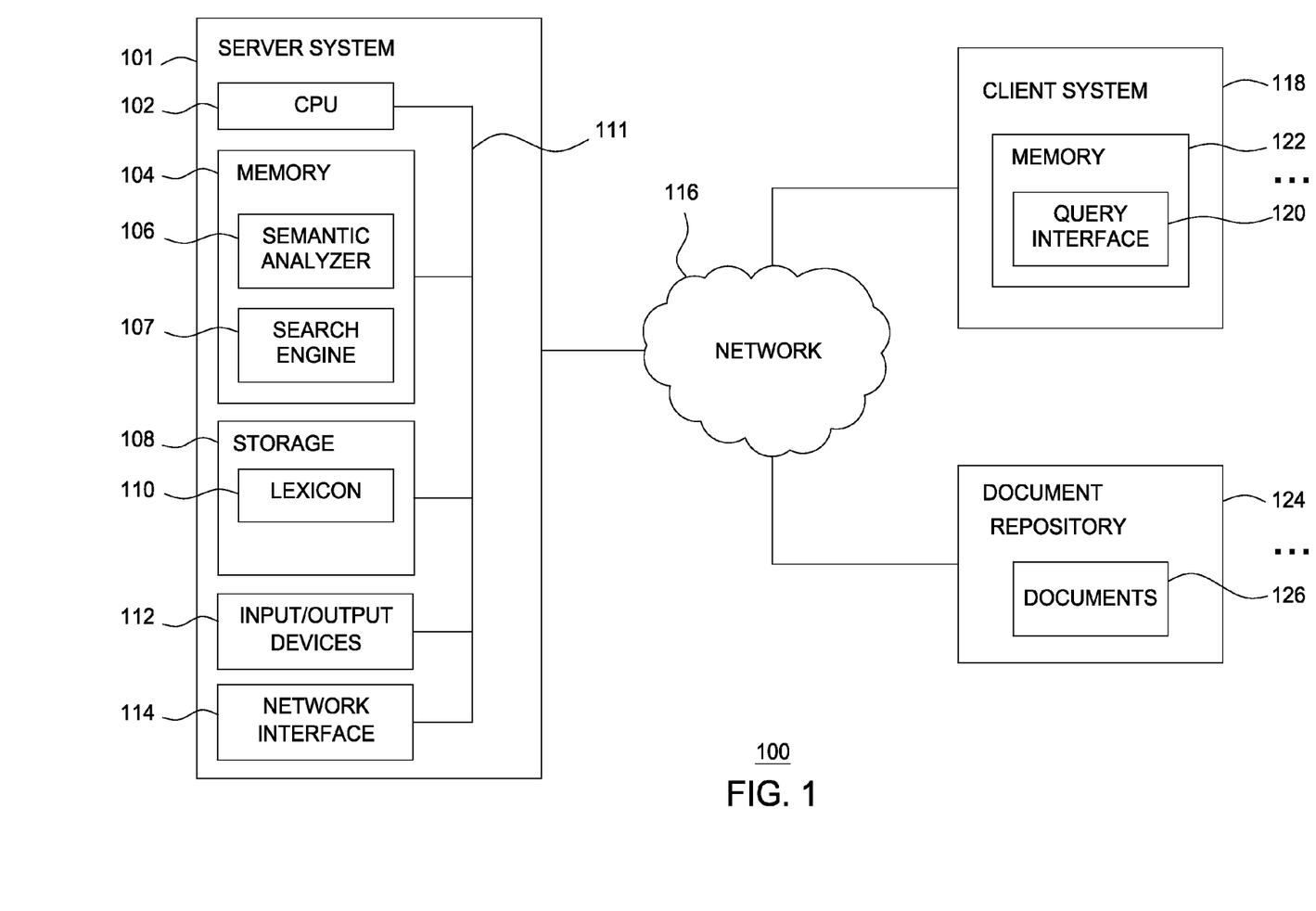
FIG. 1 is a block diagram illustrating a computing environment that includes a search engine, a semantic analyzer, and a lexicon, according to one embodiment of the invention.

FIG. 1 is a block diagram illustrating a computing environment 100 that includes a search engine 107, a semantic analyzer 106, and a lexicon 110, according to one embodiment of the invention. A server system 101 is included to be representative of existing computer systems, e.g., desktop computers, server computers, laptop computers, tablet computers, and the like. However, the server system 101 illustrated in FIG. 1 is merely an example of a computing system. And embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, server system 101 includes a central processing unit (CPU) 102, which obtains instructions and data via a bus 111 from memory 104 and storage 108. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 108 stores application programs and data for use by server system 101. Storage 108 may be hard-disk drives, flash memory devices, optical media and the like. Server system 101 may be connected to a data communications network 116 (e.g., a local area network, which itself may be connected to other networks such as the internet). As shown, storage 108 includes lexicon 110. In one embodiment, lexicon 110 stores a lexicon for a specific language, which embodies the knowledge of that language. In other words, lexicon 110 contains all of the forms, meanings, and usage of words and phrases of the language. One well known example of a lexicon is the WordNet semantic lexicon for the English language available from Princeton University. Additionally, server system 101 includes input/output devices 112 such as a mouse, keyboard and monitor, as well as a network interface 114 used to connect server system 101 to network 116.

Memory 104 can be one or a combination of memory devices, including random access memory, nonvolatile or backup memory, (e.g., programmable or flash memories, read-only memories, etc.). As shown, memory 104 includes search engine 107 and semantic analyzer 106. Search engine 107 obtains query results (documents) that satisfy conditions included in a query; typically, one or more search terms. For example, if a user enters "energy bill" as a query search term, then documents that contain the words, "energy" and/or "bill," are retrieved. In one embodiment, the semantic analyzer 106 applies lexical analysis techniques to the query terms in order to determine the semantic meaning of the search terms, e.g., a semantic meaning of "energy bill." Semantic analyzer 106 then filters the search results using the semantic meaning. For example, semantic analyzer 106 may determine that "energy bill" refers to legislation. In that case, documents that both include the requested search terms and use the terms in the same semantic meaning are returned in the query results. Thus, in our example, documents that use the terms "energy" and "bill" in context of legislation are identified and returned as search results, while documents that include the words "energy" and "bill" to refer to invoices for electric utility bills (as well as other uses) are filtered out.

Client computer system 118 may be configured with the same types of components as server system 101, e.g., a CPU, a memory, 122, and storage. Additionally, as shown, memory 122 includes query interface 120, which may allow a user to enter a search query. Search engine 107 may receive the query and identify a set of documents 126 from a document repository 124 that match conditions specified by the query (e.g., a set of search terms). Document repository 124 may include any computer system that stores documents 126 that are searchable. Further, documents 126 may include any type of stored information, such as web pages, text/pdf files, emails, etc. Semantic analyzer 106 may filter documents and return a list of results to query interface 120. In one embodiment, query interface 120 is a web browser. Of course, input/output devices 112 on server system 101 may also be used to enter queries and receive results. Furthermore, client system 118 may be an individual's desktop personal computer or any other computer system connected to network 116 such as a mobile device, PDA, laptop, etc.

Figure 2:
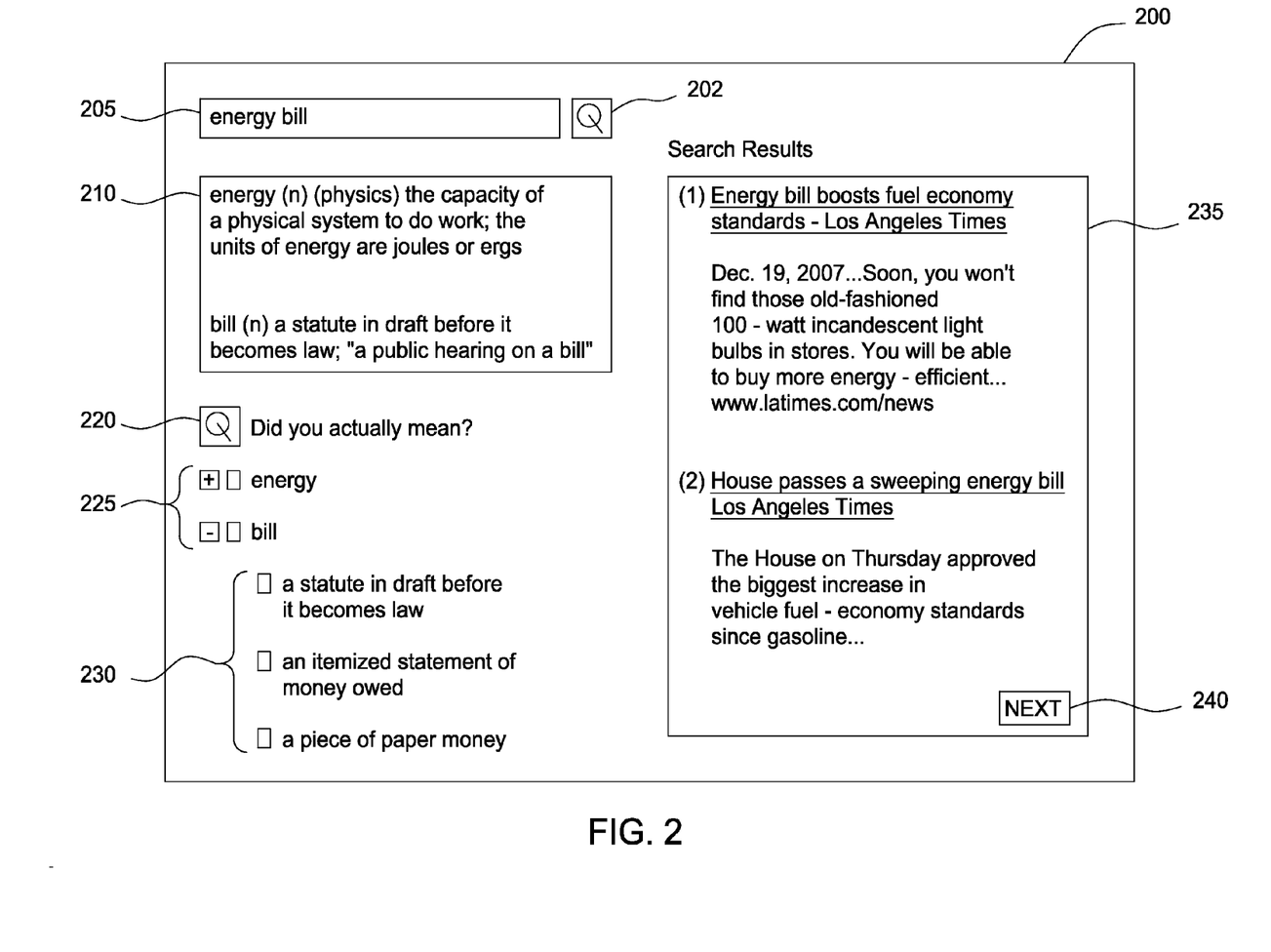
FIG. 2 is an example display of a query interface with search results for a word sense, according to one embodiment of the invention.

FIG. 2 is an example display 200 of a query interface with search results for a word sense, according to one embodiment of the invention. As shown, a query box 205 contains the search words "energy bill." After a user selects a query execution button 202, semantic analyzer 106 may analyze the words "energy bill" in order to select a word sense for "energy" and "bill." In this example, "energy bill" is a context window. As used herein, a "context window" includes a search word and words surrounding the search word used to determine a semantic meaning for the search word. For example, if a user wishes to identify television shows run on Sundays, the user may enter "regularly scheduled programs that run on Sundays," into query box 205. Semantic analyzer 106 analyzes the words in the context window, which include "regularly," "scheduled," "programs," "that," "run," "on," and "Sundays." Thus, semantic analyzer 106 may determine "programs" is used in a sense to refer to television programs instead of a sense used to refer to computer programs.

In one embodiment, after the semantic analyzer 106 selects a sense for the terms "energy" and "bill" the selected sense definitions may be displayed in a word sense definition window 210. Illustratively, the definition window 210 provides an appropriate definition for "energy" and "bill," based on the sense identified for the search terms in the query box 405. Of course, if additional words are within the context window, then semantic analyzer 106 may select a sense for each additional word. After search engine 107 provides a set of query results (e.g., a list of documents), semantic analyzer 106 may filter the results using the selected word senses and display results in search results window 235. A next button 240 may be used to view additional search results. If a user wishes to filter search results using a different sense for "energy" or "bill," then either word may be selected from a checkbox list 225. As shown, a list 230 of three senses for "bill" is displayed. The user may execute a new search query by selecting a sense and clicking on execute query button 220.

Figure 3:
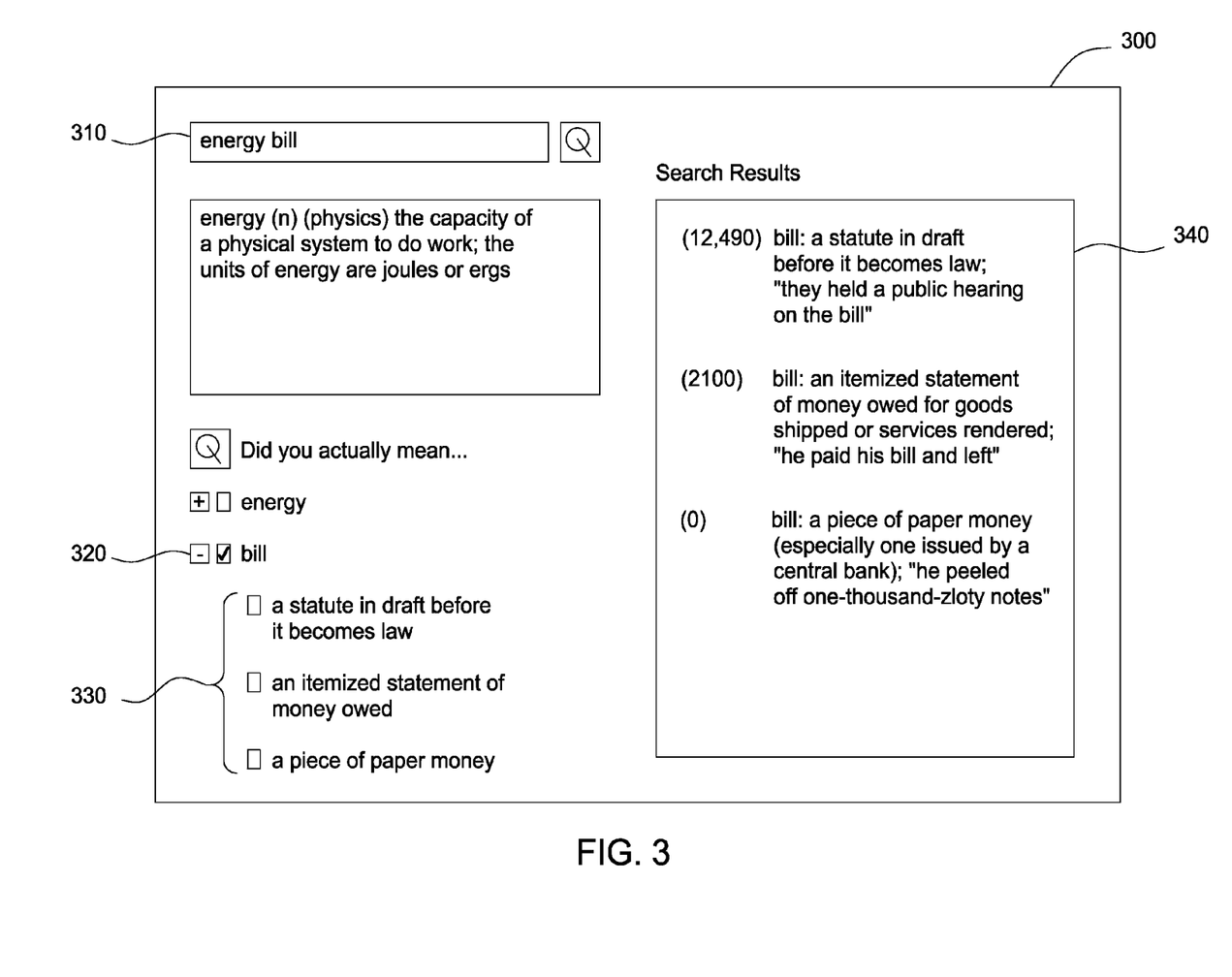
FIG. 3 is an example display of a query interface with a summary of search results for multiple word senses, according to one embodiment of the invention.

FIG. 3 is an example display 300 of a query interface with a summary of search results for multiple word senses, according to one embodiment of the invention. As shown, query box 310 contains the search terms "energy" and "bill." As in FIG. 2, a list 330 of three senses for "bill" is displayed. Illustratively, a user has selected the checkbox 320 for the word, "bill," without selecting a word sense for "bill." After executing a search, search results window 340 displays a summary of search results showing the number of documents that match each word sense for "bill." As shown, there are results that match the first two senses of "bill," as used in "energy bill." One sense describes energy legislation, while the other sense describes an energy utility bill. However, no results were returned for the third sense of "bill," because "energy bill" is not used to refer to a piece of paper money (as in a dollar bill).

Figure 4:
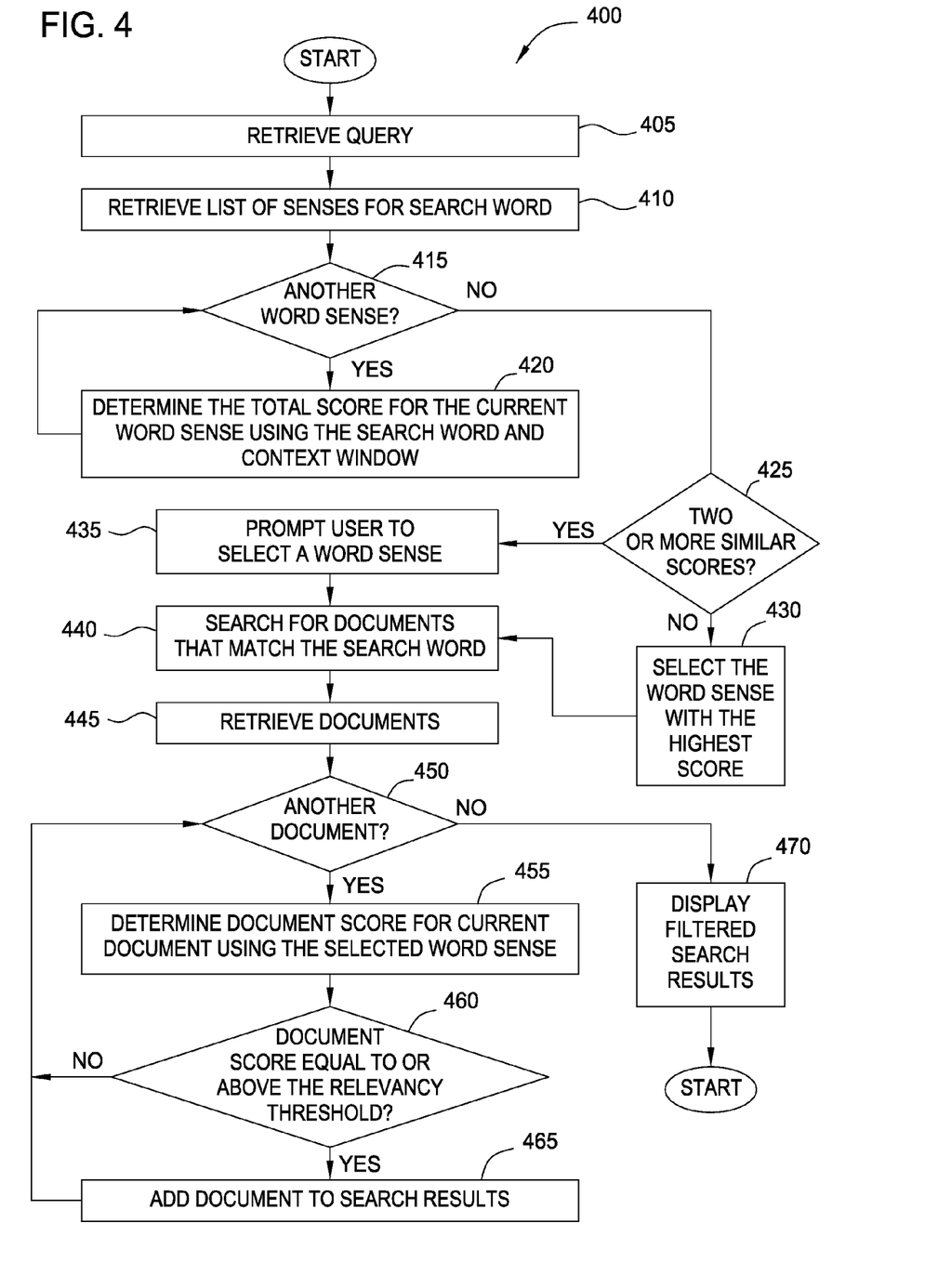
FIG. 4 is a flow diagram illustrating a method for determining a word sense and filtering search results, according to one embodiment of the invention.

FIG. 4 is a flow diagram illustrating a method 400 for determining a word sense and filtering search results, according to one embodiment of the invention. As shown, the method begins at step 405, where the semantic analyzer 106 receives a query from the query interface 120. At step 410, the semantic analyzer 106 retrieves a list of senses for a search word contained in the query from lexicon 110. At step 415, the semantic analyzer 106 determines if there is another word sense from the list obtained at step 410. If so, then at step 420, semantic analyzer 106 applies one or more lexical analysis techniques (see FIG. 6) to a context window to determine a total score for the current word sense.

Once a score has been determined for each word sense, relative to the search terms, at step 425, the semantic analyzer 106 determines whether two or more word senses have similar total scores. If not, then the word sense with the highest total score is selected at step 430. However, if two or more word senses have similar total scores, then the system may prompt the user to select a desired word sense at step 435. After a word sense is selected, search engine 107 may identify a set of documents that include each of the search terms (step 440). In some embodiments, documents 126 in a document repository may contain metadata that indicates which word sense is being used in the document. In such instances, search engine 107 may then select documents based upon the metadata. However, for method 400, it is assumed that documents do not contain such metadata.

Once a set of documents that include the search terms are retrieved, a loop consisting of steps 450-465 occurs to process each document identified by the search engine 107. At step 450, the semantic analyzer 106 determines whether another document remains to be processed. If so, at step 455, semantic analyzer 106 determines a document score for a document, relative to the word sense selected for the query. The process for determining a document score is similar to the process for determining a total score for a word sense in a query (as in step 420). Thus, the same lexical analysis techniques may be used to calculate a document score for the selected word sense. For example, the document score may be determined for a search term present using a context window of five words surrounding the use of search term in the document. Of course, the context window for evaluating the use of a search term within a document may be set as a matter of experience and/or user preference.

At step 460, semantic analyzer 106 determines if the document score for the current document is equal to or above a relevancy threshold. As used herein, a relevancy threshold is the minimum document score required for a document to be included in search results. That is, the relevancy score may be used to determine whether the document uses the search term in the same sense selected for the query. If the document score is equal to or above the relevancy threshold, then at step 465 the current document is added to the search results. Semantic analyzer then returns to step 450. In other words, the semantic analyzer 106 may determine a "sense" in which the search term is used within the document being evaluated. If the best word sense (based on the document score) matches the selected word sense, then the document may be included in the query results. However, if the document score is below the relevancy threshold, then the current document is not added to the search results and semantic analyzer 106 returns to step 450. Once no more documents remain to be processed, the filtered search results are displayed in the query interface 120 (step 470).

Figure 5:
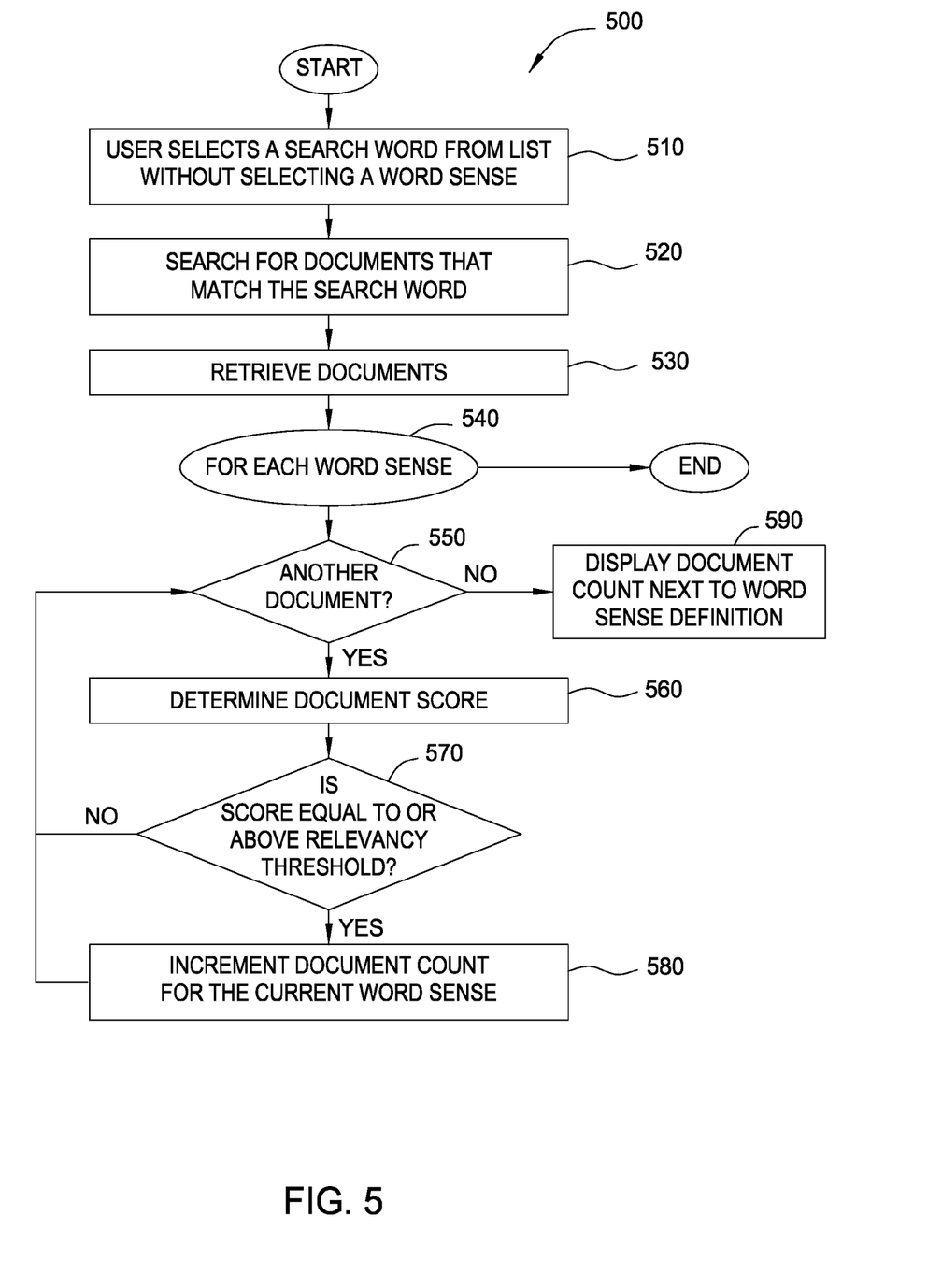
FIG. 5 is a flow diagram illustrating a method for summarizing search results for multiple word senses, according to one embodiment of the invention.

FIG. 5 is a flow diagram illustrating a method 500 for summarizing search results for multiple word senses, according to one embodiment of the invention. As shown, the method begins at step 510, where a user selects a search word 320 without selecting a word sense from a list of word senses 330. In the display 300 of FIG. 3, for example, the user selects the checkbox for the search word 320, "bill," without selecting one of the word senses from the list of word senses 330. At step 520, the search engine 107 identifies documents that include some (or all) of the search terms included in the query. For example, as shown in display 300, search engine 107 identifies documents that contain the words, "energy" and/or "bill."

At step 530, the search engine 107 returns the set of documents that include the search terms, i.e., documents that contain the words, "energy" and/or "bill" to the semantic analyzer 106. A loop consisting of steps 540-590 occurs for each word sense for the search term selected at step 510. At step 550, semantic analyzer 106 determines whether there is another document to be processed. If so, at step 560, the semantic analyzer 106 determines a score for the use of the selected word, relative to the current word sense. At step 570, the semantic analyzer 106 determines if the document score for the current word senses is equal to or above a minimum relevancy threshold. If not, then step 550 is next. If so, then at step 580, a document count for the current word sense is incremented. That is, if the document uses the word in the same sense as the current sense, then the document count for the word sense is incremented. For example, in search results display 340 of FIG. 3, the document count for the first word sense for "bill" is 12,490. In other words, the search engine found 12,490 documents that use the word, "bill," to refer to a statute.

At step 590, once no more documents remain to be processed, the document count may be displayed next to the sense definition in the search results window 340. For example, search results window 340 of FIG. 3 shows 12,490 documents that match the first word sense for "bill," 2100 documents that match the second word sense, and no documents that match the last word sense. Assume for this example that no documents were found for the last word sense because "energy bill" is not used to refer to a piece of paper money (as in a dollar bill) in any document in the corpus of available documents.

Figure 6:
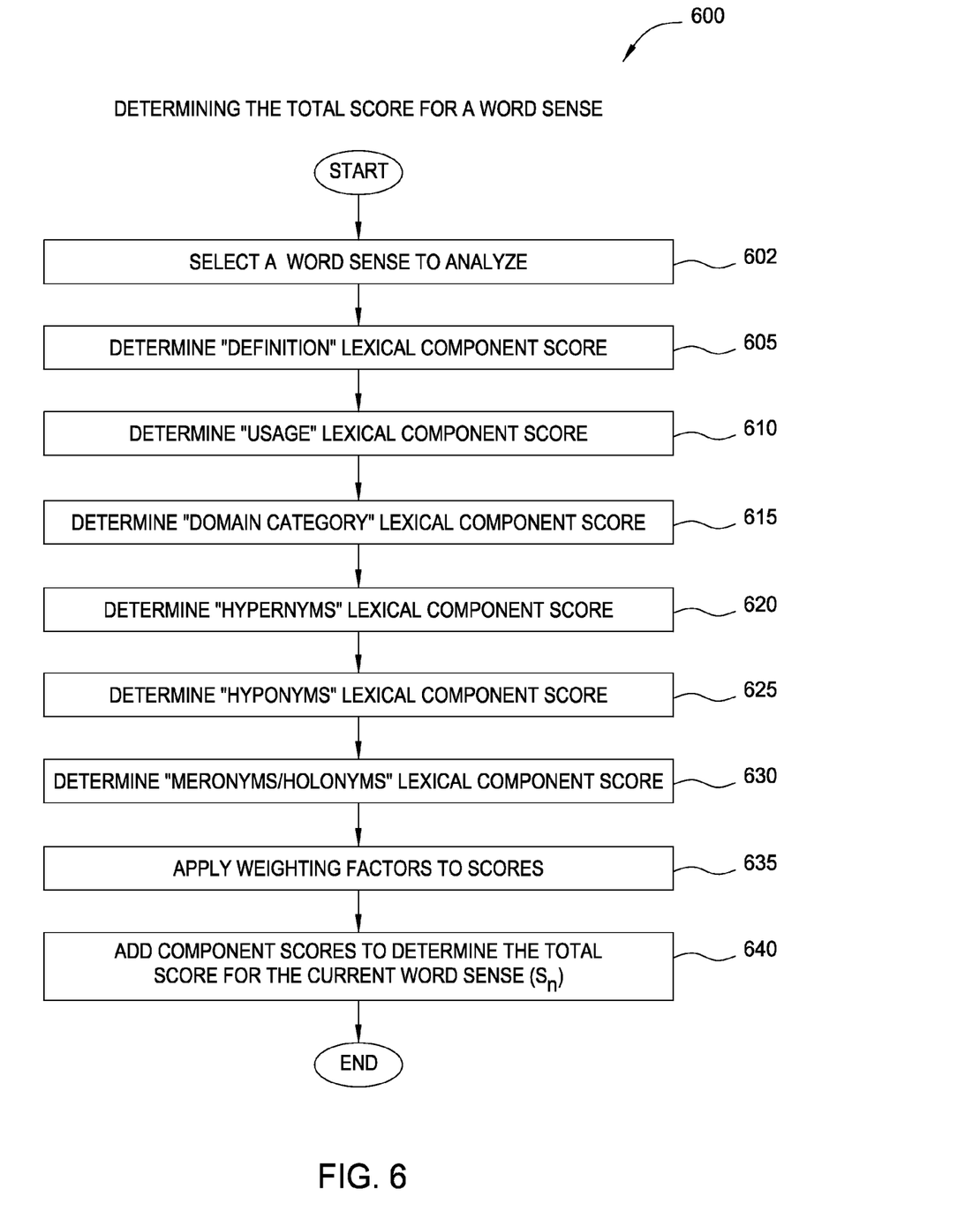
FIG. 6 is a flow diagram illustrating a method 600 for determining a total score for the use of a word in a given document relative to a selected word sense, according to one embodiment of the invention.

FIG. 6 is a flow diagram illustrating a method 600 for determining a total score for the use of a word in a given document relative to a selected word sense, according to one embodiment of the invention. As shown, method 600 begins at step 602, where a user or semantic analyzer 106 selects a particular word sense to analyze. In steps 605-630, the semantic analyzer calculates six different lexical component scores for the selected word sense. As used herein, a lexical component score generally refers to a number calculated using a particular lexical analysis technique (six techniques are described below). The total score for the word sense is the sum of the lexical component scores. As described relative to FIGS. 2 and 4, the word sense with the highest total score may be used to filter search results. As described relative to FIGS. 3 and 5, the total score (called the "document score") is used to determine whether to include a document in the search results, i.e., whether the document uses the search term according to the selected word sense. Of course, a smaller or greater number of lexical component scores may be used, depending on the number of available lexical analysis techniques.

At step 605, semantic analyzer 106 may determine a "definition" lexical component score for the selected word sense. Each word sense has its own definition. The words in the context window can be compared to the words in the definition of the sense. If words in the sense definition match words in the context window, then the definition component score may be high for that sense. For example, the context window may be:

"My kids are too old to play with toys."

Three sense definitions for "toy" may include:

An object for children to play with.

Something of little importance; a trifle.

A dog of a very small breed.

If the definition component score for the first word sense is being determined, then semantic analyzer will match the context window words "children" and "play" to the definition. Since two words match, the definition lexical component score for the first sense of "toy" may be high. Note that morphological variants and synonyms may be accounted for, as reflected in the match between "kids" and "children." Additionally, a definition may include example sentences, which may cause more word matches with the context window.

At step 610, semantic analyzer 106 may determine a "usage" lexical component score for the selected word sense. The usage lexical component score is based upon a usage metric for the selected word sense. A usage metric indicates how often a particular sense of a word is used in a language as compared to the other senses. In the "toy" example above, the first sense (an object for children to play with) may be more commonly used than the remaining senses. If so, then the first sense will have a higher usage metric than remaining senses. In one embodiment, the usage metric may be a numeric value representing a relative importance for a given word sense. The usage metric may be considered the default score for a sense which contributes to the total score for that word sense without any consideration of the words in the context window. Therefore, the usage lexical component score may be assigned a relatively low weighting factor.

As used herein, a "weighting factor" generally refers to a number that a lexical component score is multiplied by in order to increase or decrease the lexical component score's contribution to the total score for a word sense. In one embodiment, such a weighting factor may be used to account for the variance in the metrics between each lexical component. The weighting factor may also be used where normalization between scores can not be achieved. For example, the score assigned by one lexical component may be a frequency count of word occurrences, while another may be a floating point number between 0 and 1. The frequency count (whole numbers) would have a much greater affect on the total score unless compensated for by weighting factors.

At step 615, semantic analyzer 106 may determine a "domain category" lexical component score for the selected word sense. As described above, the lexicon 110 may assign a domain to which the word sense belongs. The domain itself is another sense of a word (or group of words) and thus has its own definition. For example, one of the definitions for "program" may be "a set of instructions for a computer to execute." The sense of the word, "program," may be assigned to the domain category, "computer science," which may have a sense definition of "the study and application of computational hardware and software."

Semantic analyzer 106 determines the number of word senses in the context window that have the same domain category as the selected word sense. For example, the context window may be:

"The program was executed on a server."

If the selected word sense of "program" belongs to the domain category "computer science," then semantic analyzer 106 will determine that "executed" and "server" both have senses with the same domain category of "computer science." In one embodiment, a domain category lexical component score of "2" may be assigned to the selected word sense of "program."

At step 620, semantic analyzer 106 may determine a "hypernyms" lexical component score for the selected word sense. A hypernym is a word, usually broad in meaning that encompasses more specific words. For example, "snake" is the hypernym of "cobra." For a given word, an inherited hypernym tree can be formed by recursively finding the hypernym of the word's hypernym until arriving at the root of the tree. For example, the inherited hypernym tree for "snake" may be:

snake→reptile→vertebrate→animal→organism→entity

For two different words in a context window, Semantic analyzer 106 may determine how similar their word senses are by measuring the degree of overlap between the two hypernym trees. For example, the hypernym tree for "frog" may be:

frog→amphibian→vertebrate→animal→organism→entity

The context window may be:

"The pond is full of frogs and snakes."

Since the hypernym trees for "snake" and "frog" are highly related, semantic analyzer 106 may assign a high value to the hypernym lexical component score for the selected word sense of "snake." Conversely, semantic analyzer 106 would assign a low hypernym score for a different sense of snake (such as "a deceitful person").

At step 625, semantic analyzer 106 may determine a "hyponyms" lexical component score for the selected word sense. A hyponym is the inverse of a hypernym and provides a more specific relationship to a word. For example, "cobra" is a hyponym of "snake." Typically, a combination of one or more words forms the hyponym "sense" of a word. For example "bulletin board" is a more specific sense of the word "board." In one embodiment, the hyponym lexical component score for the selected word sense equals the tally of all hyponyms that occur in the context window.

At step 630, semantic analyzer 106 may determine a "meronyms/holonyms" lexical component score for the selected word sense. A holonym is the name of a whole assembly of which the meronym is a part. A meronym is a constituent member of something larger (the inverse of a holonym). For example, "brake pad" is a meronym of the word sense for "brake" defined as "a system used for stopping the motion of a vehicle." Semantic analyzer 106 determines if meronyms and holonyms are present in the context window. Thus, using the above example, "brake" would not be interpreted to mean "giving some leeway, as in give me a brake." In one embodiment, the meronym/holonym lexical component score for a selected word sense may equal the tally of all meronyms and holonyms occurring in the context window.

At step 635, semantic analyzer 106 may apply weighting factors to the lexical component scores. As described above, a weighting factor is multiplied by a lexical component score in order to increase or decrease the lexical component score's contribution to the total score for the selected word sense. Finally, at step 640, all of the lexical component scores are added to determine a total score for the selected word sense.

Advantageously, as described above, embodiments of the invention apply lexical analysis techniques to a query search word and contextual words surrounding the search word (i.e., a context window) to determine a semantic meaning of the search word. Search results may be filtered to include only documents that use the search word (or words) according to the same (or similar) semantic meaning. By using information contained in a lexicon, a semantic analyzer may employ multiple lexical analysis techniques to a context window in order to determine a total score for each semantic meaning of the search word. The semantic analyzer selects the semantic meaning with the highest total score. Alternatively, a user may select a semantic meaning. The same lexical analysis techniques are used to filter search engine results by selecting documents that use the search terms according to the same semantic meaning. Finally, the semantic analyzer may provide a summary that includes the number of documents that use each semantic meaning. Thus, by employing multiple lexical analysis techniques to a context window, embodiments of the invention provide more accurate search results than traditional information retrieval systems.

While the foregoing is directed to embodiments of the present invention, other and further embodiments of the invention may be devised without departing from the basic scope thereof, and the scope thereof is determined by the claims that follow.

What is claimed is:

1. A computer-implemented method of filtering search results returned for a search query, wherein the search results include one or more documents, the method comprising:
    identifying at least a first search term included in the search query;
    determining, by operation of one or more computer processors, a plurality of word usage senses associated with the first search term;
    selecting a first word usage sense from the plurality of word usage senses associated with the first search term for use in filtering the search results;
    filtering the search results to include only documents in which the first search term is used in a word usage sense matching the selected first word usage sense, wherein at least one document in which the first search term is used in a different word usage sense is filtered out of the search results; and
    returning the set of filtered search results as the search results for the search query.

2. The method of claim 1, wherein selecting the first word usage sense from the plurality of word usage senses associated with the first search term, comprises:
    for each of the plurality of word usage senses:
        determining a plurality of lexical component scores by applying a plurality of lexical analysis techniques using a respective word usage sense and a context window of words surrounding the first search term,
        applying a weighting factor to each lexical component score, and
        adding the lexical component scores to determine a total score for a respective word usage sense; and
    selecting the word usage sense with a highest total score as the first word usage sense.

3. The method of claim 2, wherein one of the lexical analysis techniques comprises:
    identifying words in a definition of one of the respective word usage senses; and
    calculating a value based upon the number of words in the definition that match words in the context window of words.

4. The method of claim 2, wherein one of the lexical analysis techniques comprises calculating a value based upon how often one of the respective word usage senses is used in a language, relative to other word usage senses of the plurality.

5. The method of claim 2, wherein one of the lexical analysis techniques comprises:
    identifying a domain associated with one of the respective word usage senses;
    identifying one or more domains of the plurality of word usage senses associated with the words in the context window of words;
    determining a value based upon a number of words in the context window of words that belong to the same domain as the first word usage sense.

6. The method of claim 2, wherein one of the lexical analysis techniques comprises:
    identifying a first hypernym tree for the first word usage sense;
    identifying a second hypernym tree for at least one word in the context window of words; and
    calculating a value based upon the degree of overlap between the first and second hypernym trees.

7. The method of claim 2, wherein one of the lexical analysis techniques comprises calculating a value based upon the number of words in the context window of words that are hyponyms of the first word usage sense.

8. The method of claim 2, wherein one of the lexical analysis techniques comprises calculating a value based upon the number of words in the context window of words that are a meronym or holonym of the first word usage sense.

9. The method of claim 2, further comprising, generating a summary display of search results for each word usage sense, wherein the summary for each word usage sense includes:
    a respective definition of the word usage sense; and
    a total number of the documents that use the first search term according to the respective word usage sense.

10. A computer readable storage medium containing a program which, when executed, performs an operation for filtering search results returned for a search query based upon a word usage sense, wherein the search results include one or more documents, the operation comprising:
    identifying at least a first search term included in the search query;
    determining a plurality of word usage senses associated with the first search term;
    selecting a first word usage sense from the plurality of word usage senses associated with the first search term for use in filtering the search results;
    filtering the search results to include only documents in which the first search term is used in a word usage sense matching the selected first word usage sense, wherein at least one document in which the first search term is used in a different word usage sense is filtered out of the search results; and
    returning the set of filtered search results as the results for the search query.

11. The computer readable storage medium of claim 10, wherein selecting the first word usage sense from the plurality of word usage senses associated with the first search term, comprises:
    for each of the plurality of word usage senses:
        determining a plurality of lexical component scores by applying a plurality of lexical analysis techniques using a respective word usage sense and a context window of words surrounding the first search term,
        applying a weighting factor to each lexical component score, and
        adding the lexical component scores to determine a total score for a respective word usage sense; and
    selecting the word usage sense with a highest total score as the first word usage sense.

12. The computer readable storage medium of claim 11, wherein one of the lexical analysis techniques comprises:
    identifying words in a definition of one of the respective word usage senses; and
    calculating a value based upon the number of words in the definition that match words in the context window of words.

13. The computer readable storage medium of claim 11, wherein one of the lexical analysis techniques comprises calculating a value based upon how often one of the respective word usage senses is used in a language, relative to other word usage senses of the plurality.

14. The computer readable storage medium of claim 11, wherein one of the lexical analysis techniques comprises:
- identifying a domain associated with one of the respective word usage senses;
- identifying one or more domains of the plurality of word usage senses associated with the words in the context window of words;
- determining a value based upon a number of words in the context window of words that belong to the same domain as the first word usage sense.

15. The computer readable storage medium of claim 11, wherein one of the lexical analysis techniques comprises:
- identifying a first hypernym tree for the first word usage sense;
- identifying a second hypernym tree for at least one word in the context window of words; and
- calculating a value based upon the degree of overlap between the first and second hypernym trees.

16. The computer readable storage medium of claim 11, wherein one of the lexical analysis techniques comprises calculating a value based upon the number of words in the context window of words that are hyponyms of the first word usage sense.

17. The computer readable storage medium of claim 11, wherein one of the lexical analysis techniques comprises calculating a value based upon the number of words in the context window of words that are a meronym or holonym of the first word usage sense.

18. A system, comprising:
- a processor; and
- a memory containing a program, which, when executed by the processor is configured to perform an operation for filtering search results returned for a search query based upon a word usage sense, wherein the search results include one or more documents, the operation comprising:
  - identifying at least a first search term included in the search query;
  - determining a plurality of word usage senses associated with the first search term;
  - selecting a first word usage sense from the plurality of word usage senses associated with the first search term for use in filtering the search results;
  - filtering the search results to include only documents in which the first search term is used in a word usage sense matching the selected first word usage sense, wherein at least one document in which the first search term is used in a different word usage sense is filtered out of the search results; and
  - returning the set of filtered search results as the results for the search query.

19. The system of claim 18, wherein selecting the first word usage sense from the plurality of word usage senses associated with the first search term, comprises:
- for each of the plurality of word usage senses:
  - determining a plurality of lexical component scores by applying a plurality of lexical analysis techniques using a respective word usage sense and a context window of words surrounding the first search term,
  - applying a weighting factor to each lexical component score, and
  - adding the lexical component scores to determine a total score for a respective word usage sense; and
- selecting the word usage sense with a highest total score as the first word usage sense.

20. The system of claim 19, wherein one of the lexical analysis techniques comprises:
- identifying words in a definition of one of the respective word usage senses; and
- calculating a value based upon the number of words in the definition that match words in the context window of words.

21. The system of claim 19, wherein one of the lexical analysis techniques comprises calculating a value based upon how often one of the respective word usage senses is used in a language, relative to other word usage senses of the plurality.

22. The system of claim 19, wherein one of the lexical analysis techniques comprises:
- identifying a domain associated with one of the respective word usage senses;
- identifying one or more domains of the plurality of word usage senses associated with the words in the context window of words;
- determining a value based upon a number of words in the context window of words that belong to the same domain as the first word usage sense.

23. The system of claim 19, wherein one of the lexical analysis techniques comprises:
- identifying a first hypernym tree for the first word usage sense;
- identifying a second hypernym tree for at least one word in the context window of words; and
- calculating a value based upon the degree of overlap between the first and second hypernym trees.

24. The system of claim 19, wherein one of the lexical analysis techniques comprises calculating a value based upon the number of words in the context window of words that are hyponyms of the first word usage sense.

25. The system of claim 19, wherein one of the lexical analysis techniques comprises calculating a value based upon the number of words in the context window of words that are a meronym or holonym of the first word usage sense.

* * * * *